J. J. Esler.
Seeding Mach.

Nº 88,465. Patented Mar. 30, 1869.

Witnesses.
Robert Burns.
Wm. W. Herthel.

Inventor.
Jacob J. Esler

UNITED STATES PATENT OFFICE.

JACOB J. ESLER, OF BELLEVILLE, ILLINOIS.

IMPROVEMENT IN SEEDING-MACHINE.

Specification forming part of Letters Patent No. 88,465, dated March 30, 1869.

*To all whom it may concern:*

Be it known that I, JACOB J. ESLER, of Belleville, in the county of St. Clair and State of Illinois, have made certain new and useful Improvements in Seed-Feeding Devices for Grain-Drills; and I do hereby declare that the following is a full and clear description thereof, reference being had to the accompanying drawings, and to the letters of reference marked thereon.

This invention relates to an improvement in the devices for dropping or feeding seed from the seed-box to the conveyer-tube, or to the flukes of the usual form of grain planting or drilling machine; and said invention relates more especially to the method of gaging or regulating the quantity of seed fed or dropped, as will hereinafter be more fully explained.

To enable those herein skilled to make and use my said improvement, I will now fully describe the construction and operation thereof, referring to the accompanying—

Figure 1:
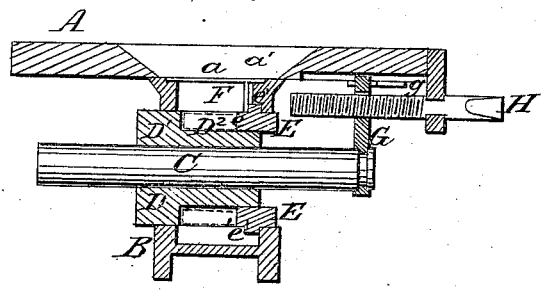
Figure 2:
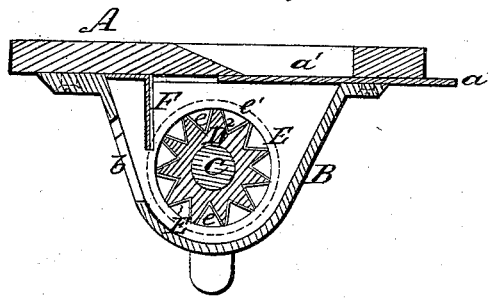
Figure 3:
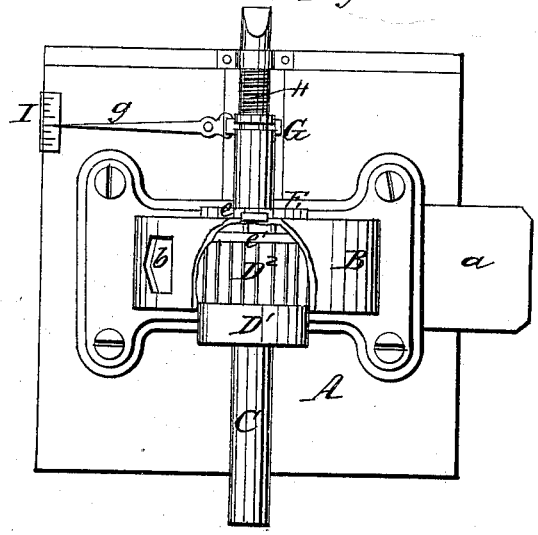

Figure 1 as a sectional elevation, longitudinally; to Fig. 2 as a transverse sectional elevation, and to Fig. 3 as a plan looking from below.

I construct the grain-drill frame upon wheels, with its flukes, feed-box, and other devices in the usual manner; and my said invention in nowise relates to a special change in any of said parts. To the under side of the bottom of the feed-box A, I attach the feed-hopper B.

For each fluke there will be a separate hopper, B, and a slide, a, will, in hopper, check or regulate the passage of seed to said hopper. In this wise, one or more hoppers being closed—that is, the feed of grain thereto being checked by the slide a being closed—the drill may be operated for a part only of its flukes, in accordance with the width of ground to be planted upon. The said hoppers will be usually cast-iron housings, secured by screws or bolts to the bottom A of the general form indicated in the drawings. Through all the hoppers, of which but one is shown, I pass the shaft C, said shaft lying transversely across the frame of the machine. On said shaft, where it passes through the hopper B, I arrange the feed-cylinder or boss D, having the cylindrical part $D^1$ and the fluted part $D^2$. The cylindrical boss $D^1$ will fit the hopper side, so as to prevent egress of seed. The said shaft C is revolved by gear-wheels in the usual manner, and the boss D is firmly connected with said shaft, and revolves therewith.

At the end of the fluted part $D^2$ I arrange the rosette E, fitting on its outer circumference into the side of the hopper B, and thus preventing egress of seed, and having lugs or teeth e projecting into each channel of the fluted part $D^2$, and fitting therein. Said rosette E will have a cylindrical shoulder, $e'$, resting against the inner side of the hopper B, thus preventing lateral motion of said rosette on one side. To prevent lateral play on the other, said shoulder $e'$ will be guided against the seed-check plate F, which is secured to or forms part of the housing B.

It is plain, from the construction of said parts, that as the seed passes from the seed-box through the opening $a'$, it will fall around the feed-cylinder D until it reaches the lowest point of the hopper B.

In order that the height of the seed in the feed-box, and its quantity, or any agitation of the seed, shall not influence the regularity of discharge of seed into the tubes of the flukes, I arrange the discharge-opening b at a proper height above the lowest point of the hopper B, and the revolving shaft C will then, by the fluted feed-cylinder $D^2$, carry up the seed from the bottom of the hopper and discharge it in fixed quantities at b, as desired. But as it is necessary to increase or lessen the quantity of seed in accordance with the soil and in accordance with the quality of the seed itself, I arrange the feed-cylinder $D^2$ to deliver a greater or less quantity of seed in the manner following: It is plain that as the seed drops into each channel or fluting of the cylinder $D^2$, the quantity of seed may be regulated by gaging the size of each channel. I therefore arrange the shaft C and its boss D for lateral movement, so as thus to withdraw the feed-cylinder $D^2$ out of the rosette E in accordance with the size of feed-channel required.

For this purpose I arrange, at the end of said shaft C, a gage-block, G, which forks about a groove of the shaft C, and which is moved by the gage-screw H, said screw being secured in the main frame of the drill, and having a square end for application of a crank or wrench to turn the same. Thus, by turning said screw H the operator moves the shaft C and each feed-cylinder thereon, to decrease or increase the carrying contents of the channels of each feed-cylinder $D^2$; and it is plain that the quantity of seed fed to the flukes may thus be gaged, whether the shaft C continue in rotation or not, and thus the operator need in nowise interrupt the operation of the drill to change the feed. On the gage-block G I arrange a finger, $g$, which will move laterally with the block, and which indicates on the gage-card I its number of pecks or bushels of grain fed or planted per acre.

The check-plate F, heretofore described, is arranged to stand tangentially over the feed-cylinder $D^2$, in such wise as to check the passage of seed upwardly, and beyond the discharge-opening $b$.

Having thus fully described my said invention, what I claim is—

The shaft C, its feed-cylinder $D^2$, gage-block G, and screw H, substantially as set forth.

JACOB J. ESLER.

Witnesses:
GEO. P. HERTHEL, Jr.,
WM. W. HERTHEL.